(12) United States Patent
Gutman

(10) Patent No.: US 7,861,262 B1
(45) Date of Patent: Dec. 28, 2010

(54) METHOD AND SYSTEM FOR CONTROLLING A PERSONALIZED VIDEO RECORDER WITH A SET-TOP BOX

(75) Inventor: James C. Gutman, Littleton, CO (US)

(73) Assignee: Enreach Technology, Inc., San Jose, CA (US)

( * ) Notice: Subject to any disclaimer, the term of this patent is extended or adjusted under 35 U.S.C. 154(b) by 1106 days.

(21) Appl. No.: 09/948,445

(22) Filed: Sep. 7, 2001

(51) Int. Cl.
G06F 3/00 (2006.01)
G06F 13/00 (2006.01)
H04N 5/445 (2006.01)
H04N 9/00 (2006.01)
H04N 11/00 (2006.01)
H04N 5/91 (2006.01)
H04N 7/00 (2006.01)

(52) U.S. Cl. ............................ 725/37; 725/58; 386/1; 386/46

(58) Field of Classification Search ............ 725/80, 725/141, 147
See application file for complete search history.

(56) References Cited

U.S. PATENT DOCUMENTS

| 5,003,384 | A | * | 3/1991 | Durden et al. ............... 725/104 |
| 5,844,623 | A | * | 12/1998 | Iwamura ..................... 725/70 |
| 6,108,516 | A | * | 8/2000 | Kuether ....................... 725/61 |
| 6,137,539 | A | * | 10/2000 | Lownes et al. ............... 348/569 |
| 6,298,482 | B1 | * | 10/2001 | Seidman et al. ............. 725/101 |
| 6,442,328 | B1 | * | 8/2002 | Elliott et al. .................. 386/46 |
| 6,483,986 | B1 | * | 11/2002 | Krapf ........................... 386/68 |
| 6,532,589 | B1 | * | 3/2003 | Proehl et al. .................. 725/40 |
| 6,968,364 | B1 | * | 11/2005 | Wong et al. ................. 709/217 |
| 7,003,213 | B1 | * | 2/2006 | Hasegawa ..................... 386/83 |
| 7,206,497 | B1 | * | 4/2007 | Boyle et al. ................... 386/83 |
| 2001/0003177 | A1 | * | 6/2001 | Schena et al. ................ 705/27 |
| 2002/0009285 | A1 | * | 1/2002 | Safadi et al. ................. 386/46 |
| 2002/0046403 | A1 | * | 4/2002 | Kim et al. .................... 725/37 |
| 2002/0066113 | A1 | * | 5/2002 | Utsunomiya et al. ........ 725/146 |
| 2002/0067829 | A1 | * | 6/2002 | Ficco ......................... 380/210 |
| 2002/0069417 | A1 | * | 6/2002 | Kliger et al. .................. 725/78 |
| 2002/0144265 | A1 | * | 10/2002 | Connelly ...................... 725/39 |
| 2002/0170073 | A1 | * | 11/2002 | Miller et al. ................. 725/139 |
| 2002/0184638 | A1 | * | 12/2002 | Agnihotri et al. ............. 725/89 |
| 2005/0172332 | A1 | * | 8/2005 | Fukuda et al. .............. 725/139 |

FOREIGN PATENT DOCUMENTS

| WO | WO 02/19691 | * | 8/2001 |
| WO | WO /0219691 | * | 8/2001 |

* cited by examiner

*Primary Examiner*—Christopher Kelley
*Assistant Examiner*—Justin E Shepard

(57) ABSTRACT

One embodiment of the present invention enables a personalized video recorder (PVR) to reliably record automatically a pay-per-view show that it receives from a set-top box. Specifically, a PVR is communicatively coupled to a set-top box thereby enabling the set-top box to request and receive from the PVR its control commands. The set-top box stores these control commands enabling it to control the functionality of the PVR. Therefore, a user may utilize an electronic programming guide (EPG) provided by the set-top box to program the PVR to record (for example) a pay-per-view show. Upon completion of the programming process, the EPG of the set-top box orders the pay-per-view show while the set-top box transmits the programming instructions to the PVR. After receiving the programming instructions, the PVR adds them to its programmable task list. Subsequently, the PVR receives the ordered pay-per-view show from the set-top box and records it.

18 Claims, 6 Drawing Sheets

METHOD AND SYSTEM FOR CONTROLLING A PERSONALIZED VIDEO RECORDER WITH A SET-TOP BOX

TECHNICAL FIELD

The present invention relates to the field of electronic devices. More specifically, the present invention relates to the field of set-top boxes and personalized video recorders.

BACKGROUND ART

Modern research and technology have provided society with a wide variety of electronic devices. It is appreciated that some of these modern electronic devices are very powerful and useful to their users. For example, some of the electronic devices which fall into this category include: computers which occupy large office space down to computers which are held in one's hand, satellites which orbit around earth relaying a multitude of communication signals, global positioning system (GPS) devices capable of determining the specific locations of their users on the earth, cellular phones which enable their users to communicate wirelessly with other people, to name a few. Additionally, it should be appreciated that some modern electronic devices also provide entertainment to their users. For instance, some of the electronic devices which fall into this category include: portable and fixed radio receivers which provide their users music along with a wide array of different audio programming, video game consoles which challenge their users with varying situations within different virtual realities, portable and fixed compact disc (CD) players which provide music to their users, and portable and fixed televisions which provide a wide variety of visual and audio programming to their users.

Recently, it is understood that an increasingly amount of television programming has become available to the general public. For example, 24 hours a day consumers of the general public are able to receive and watch hundreds of different channels of television programming within their households and/or businesses via coaxial cables, broadband Internet, personal satellite dishes, and the like. Furthermore, it should be appreciated that the amount of available television programming is continuing to increase.

For example, not that long ago there use to be only three major television broadcast companies basically providing television programming throughout the entire United States of America. In contrast, currently there may be as much as one hundred times more television channels that are basically providing nationwide television programming. Furthermore, it is understood that some of these television channels are continuously broadcasting television programming 24 hours a day (e.g., ESPN, VH1, CNN, QVC, and the like). Consequently, there is a tremendous amount of television programming available to consumers of the general public.

Currently, a set-top box is one of the devices that is used to receive television programming from one or more of its different distributors. Specifically, a set-top box is a device that is designed to receive and convert (for example) a cable television signal into an input signal for a television set. Furthermore, it is appreciated that set-top boxes may also be designed to receive and convert television signals that are received via satellite dishes, the Internet, and the like. Additionally, set-top boxes may also be utilized by their users to order pay-per-view shows (e.g., movies, events, etc.) from different distributors.

However, there are disadvantages associated with pay-per-view shows. For example, one of the disadvantages is that the viewer is typically restricted to watch an ordered pay-per-view show when it is scheduled to be broadcast and not at any other time. Another disadvantage associated with a pay-per-view show is that during the broadcast of one, a viewer is typically unable to pause it in order to (for example) answer their telephone or go to their kitchen to retrieve some type of beverage and/or snack food. As such, in order to accomplish any or these tasks, the viewer may unfortunately end up missing some of the pay-per-view entertainment that he or she has paid for.

One technique for overcoming these disadvantages is to utilize a personalized video recorder (PVR) and a set-top box to automatically order and record a pay-per-view show. Specifically, a personalized video recorder is connected to an output of a set-top box in order to receive any type of television programming signals from it. Additionally, in order to enable the personalized video recorder to control some of the functionality of the set-top box, an IR (infrared) blaster is connected to receive IR transmissions from the personalized video recorder and output them to an IR receiver of the set-top box. Furthermore, special EPG (electronic programming guide) software has been designed to operate on the personalized video recorder that enables its user to program it to automatically order a pay-per-view show via the set-top box and then subsequently record that pay-per-view entertainment when it is broadcast.

For example, when the personalized video recorder is programmed by a user to order a pay-per-view movie via the set-top box and record it, the special EPG software operating on the personalized video recorder knows that the first thing that the EPG operating on the set-top box wants to receive is a confirmation to the question "Do you want to order a movie?" As such, the special EPG software waits a predetermined amount of time until it thinks that the EPG of the set-top box is waiting for the confirmation and then it causes the personalized video recorder to send a "yes" signal to the set-top box via the IR blaster. The special EPG software also knows that the next thing that the EPG of the set-top box wants to receive is a personal identification number (PIN) code. Therefore, the special software waits a predetermined amount of time until it thinks that the EPG of the set-top box is waiting for the PIN code and then it causes the personalized video recorder to send a PIN code to the set-top box via the IR blaster. In this manner, the special EPG software operating on the personalized video recorder is able to order a pay-per-view show via the EPG of the set-top box. It is appreciated that the personalized video recorder will subsequently receive the ordered pay-per-view show from the set-top box and record it.

However, it should be understood that there are some disadvantages associated with the personalized video recorder pay-per-view ordering and recording technique described above. For example, one disadvantage is that IR blasters are not very reliable and they are known to drop a digit frequently during signal transmissions. As such, this unreliability can sometimes result in the special EPG software operating on the personalized video recorder being unsynchronized with the pay-per-view ordering process of the EPG operating on the set-top box. Therefore, the user may end up paying for and recording the wrong pay-per-view show. Conversely, the user may end up not paying for a pay-per-view show, but the personalized video recorder ends up recording nothing of interest (e.g., 2 hours of "Please enter your PIN code") to its user.

DISCLOSURE OF THE INVENTION

Accordingly, a need exists for a method and system that enables a personalized video recorder to reliably record automatically a pay-per-view show (e.g., movie, event, etc.) that it receives from a set-top box. The present invention provides a method and system which satisfies the above mentioned need.

Specifically, one embodiment of the present invention enables a personalized video recorder (PVR) to reliably record automatically a pay-per-view show that it receives from a set-top box. Specifically, a personalized video recorder is communicatively coupled to a set-top box thereby enabling the set-top box to request and receive from the personalized video recorder its control commands. The set-top box stores these control commands enabling it to display them to its users and also control the functionality of the personalized video recorder. Therefore, a user may utilize an electronic programming guide (EPG) provided by the set-top box to program the personalized video recorder to record (for example) a pay-per-view show. Upon completion of the programming process, the EPG of the set-top box orders the pay-per-view show while the set-top box transmits the programming instructions to the personalized video recorder. After receiving the programming instructions, the personalized video recorder adds them to its programmable task list. Subsequently, the personalized video recorder receives the ordered pay-per-view show from the set-top box and records it.

In another embodiment, the present invention includes a system for communicatively coupling a set-top box to a personalized video recorder (PVR). The system includes a set-top box comprising a first communication interface having two way communication capability. Furthermore, the system includes a personalized video recorder comprising a second communication interface having two way communication capability that is coupled to the first communication interface of the set-top box.

In yet another embodiment, the present invention provides a computer readable medium having computer readable code embodied therein for causing a system to perform particular steps. The computer readable medium causes the system to perform the step of a set-top box transmitting a request signal to a personalized video recorder. In response to receive the request signal, the computer readable medium causes the system to perform the step of the personalized video transmitting to the set-top box a control command of the personalized video recorder. Additionally, the computer readable medium causes the system to perform the step of the set-top box receiving the control command of the personalized video recorder. The computer readable medium also causes the system to perform the step of determining whether a programming instruction has been received by the set-top box that pertains to the control command of the personalized video recorder. In response to receiving the programming instruction that pertains to the control command of the personalized video recorder, the computer readable medium causes the system to perform the step of the set-top box transmitting the programming instruction to the personalized video recorder. The computer readable medium causes the system to perform the step of the personalized video recorder receiving the programming instruction from the set-top box.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
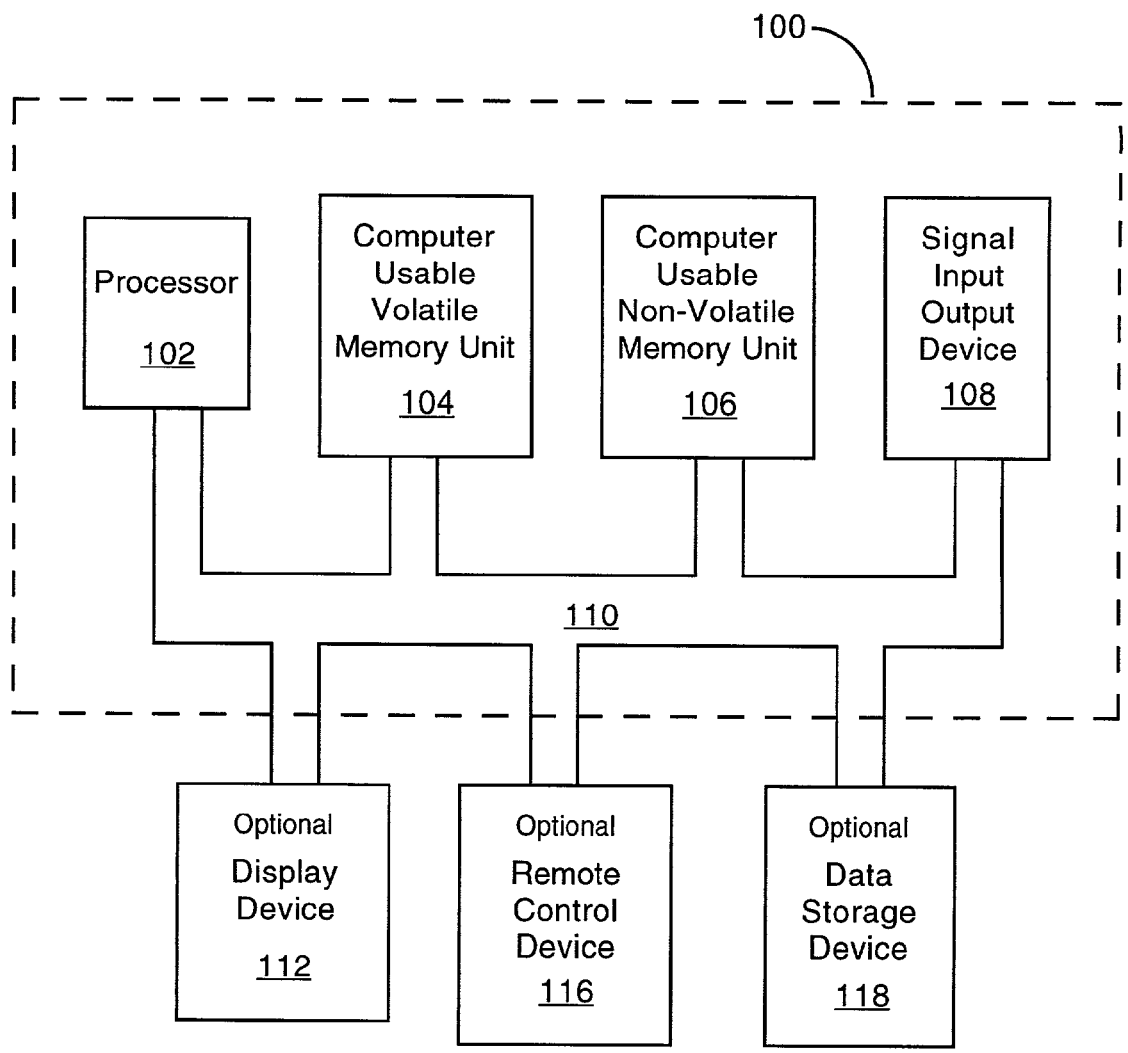
FIG. 1 is a block diagram of an exemplary set-top box used in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "transmitting" or "receiving" or "determining" or "performing" or "storing" or "recognizing" or "utilizing" or "generating" or "providing" or "ordering" or "outputting" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Exemplary Hardware in Accordance with the Present Invention

FIG. 1 is a block diagram of one embodiment of an exemplary set-top box 100 used in accordance with the present invention. It should be understood that set-top box 100 is a device that is designed to receive and convert a television signal into an input signal for another device (e.g., display device, personalized video recorder, and the like). Furthermore, set-top box 100 may be designed to receive and convert television signals that are received via cable, satellite dishes, the Internet, and the like. Within the following discussions of the present invention, certain processes and steps are discussed that are realized, in one embodiment, as a series of instructions (e.g., software program) that reside within computer readable memory units of set-top box 100 and executed by a processor(s) of set-top box 100. When executed, the instructions cause set-top box 100 to perform specific actions and exhibit specific behavior which is described in detail below.

Set-top box 100 of FIG. 1 used by an embodiment of the present invention comprises an address/data bus 110 for communicating information, one or more central processors 102 coupled with bus 110 for processing information and instructions. Central processor unit 102 may be a microprocessor or any other type of processor. The set-top box 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. The set-top box 100 also includes one or more signal generating and receiving devices 108 coupled with bus 110 for enabling set-top box 100 to interface with other electronic devices. The communication interface(s) 108 of the present embodiment may include wired and/or wireless communication technology. For example, in one embodiment of the present invention, the communication interface 108 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, Home Phone Network (HPN), broadband, etc.

Additionally, the set-top box 100 of FIG. 1 may include an optional remote control device 116 (e.g., a remote control device having a number of buttons, dials, etc.) which is communicatively coupled to bus 110 for communicating user input information and command selections to the central processor(s) 102. It is appreciated that remote control device 116 may be implemented with the capability to communicate utilizing wireless technology (e.g., infrared signaling). The set-top box 100 may also include an optional computer usable mass data storage device 118 such as a magnetic or optical disk and disk drive (e.g., hard drive or floppy diskette) coupled with bus 110 for storing information and instructions. An optional display device 112 may be coupled to bus 110 of set-top box 100 for displaying video and/or graphics. It should be appreciated that optional display device 112 may be a cathode ray tube (CRT), flat panel liquid crystal display (LCD), field emission display (FED), or other display device suitable for displaying video and/or graphic images and alphanumeric characters recognizable to a user.

Figure 2:
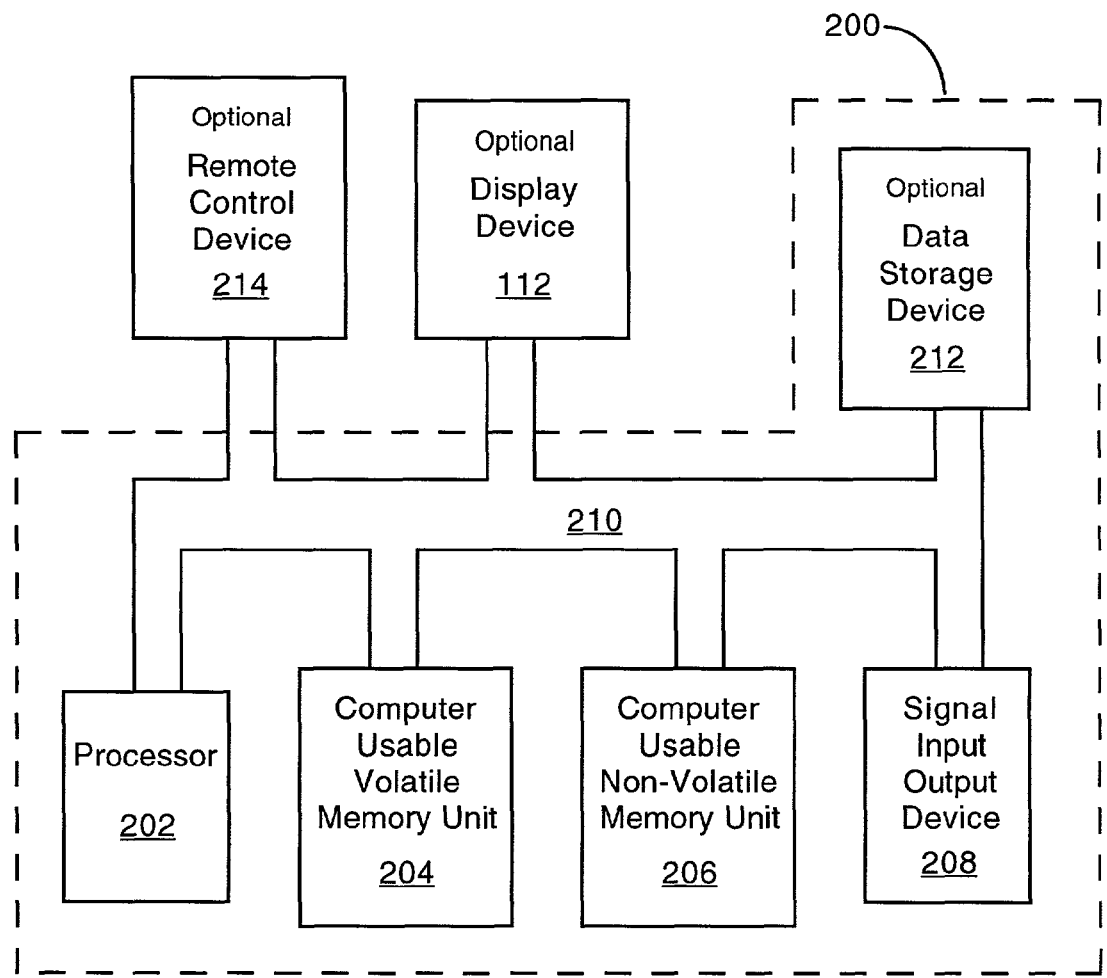
FIG. 2 is a block diagram of an exemplary personalized video recorder (PVR) used in accordance with one embodiment of the present invention.

FIG. 2 is a block diagram of one embodiment of an exemplary personalized video recorder (PVR) 200 used in accordance with the present invention. It is appreciated that the components of personalized video recorder 200 are similar to the components of set-top box 100 of FIG. 1, described above. It should be understood that other electronic devices and/or systems (e.g., digital video recorder, television Internet box, and the like) may also function as personalized video recorder 200 in accordance with the present invention. Within the following discussions of the present invention, certain processes and steps are discussed that are realized, in one embodiment, as a series of instructions (e.g., software program) that reside within computer readable memory units of personalized video recorder 200 and executed by a processor(s) of personalized video recorder 200. When executed, the instructions cause personalized video recorder 200 to perform specific actions and exhibit specific behavior which is described in detail below.

Personalized video recorder 200 of FIG. 2 used by an embodiment of the present invention comprises an address/data bus 210 for communicating information, one or more central processors 202 coupled with bus 210 for processing information and instructions. Central processor unit 202 may be a microprocessor or any other type of processor. The personalized video recorder 200 also includes data storage features such as a computer usable volatile memory unit 204 (e.g., random access memory, static RAM, dynamic RAM, etc.) coupled with bus 210 for storing information and instructions for central processor(s) 202, a computer usable non-volatile memory unit 206 (e.g., read only memory, programmable ROM, flash memory, EPROM, EEPROM, etc.) coupled with bus 210 for storing static information and instructions for processor(s) 202. The personalized video recorder 200 also includes one or more signal generating and receiving devices 208 coupled with bus 210 for enabling personalized video recorder 200 to interface with other electronic devices. The communication interface(s) 208 of the present embodiment may include wired and/or wireless communication technology. For example, in one embodiment of the present invention, the communication interface 208 is a serial communication port, but could also alternatively be any of a number of well known communication standards and protocols, e.g., USB, Ethernet, FireWire (IEEE 1394), parallel, SCSI, Bluetooth wireless communication, IR communication, HPN, broadband, etc.

Furthermore, the personalized video recorder 200 of FIG. 2 may include an optional remote control device 214 (e.g., a remote control device having a number of buttons, dials, etc.)

which is communicatively coupled to bus 210 for communicating user input information and command selections to the central processor(s) 202. It is appreciated that remote control device 214 may be implemented with the capability to communicate with personalized video recorder 200 utilizing wireless communication (e.g., infra-red signaling). The personalized video recorder 200 may also include an optional computer usable mass data storage device 212 such as a magnetic or optical disk and disk drive (e.g., hard drive or floppy diskette) coupled with bus 210 for storing information and instructions. Optional display device 112 may be coupled to bus 210 of personalized video recorder 200 for displaying video and/or graphic images and alphanumeric characters recognizable to a user.

Exemplary Network in Accordance with the Present Invention

Figure 3:
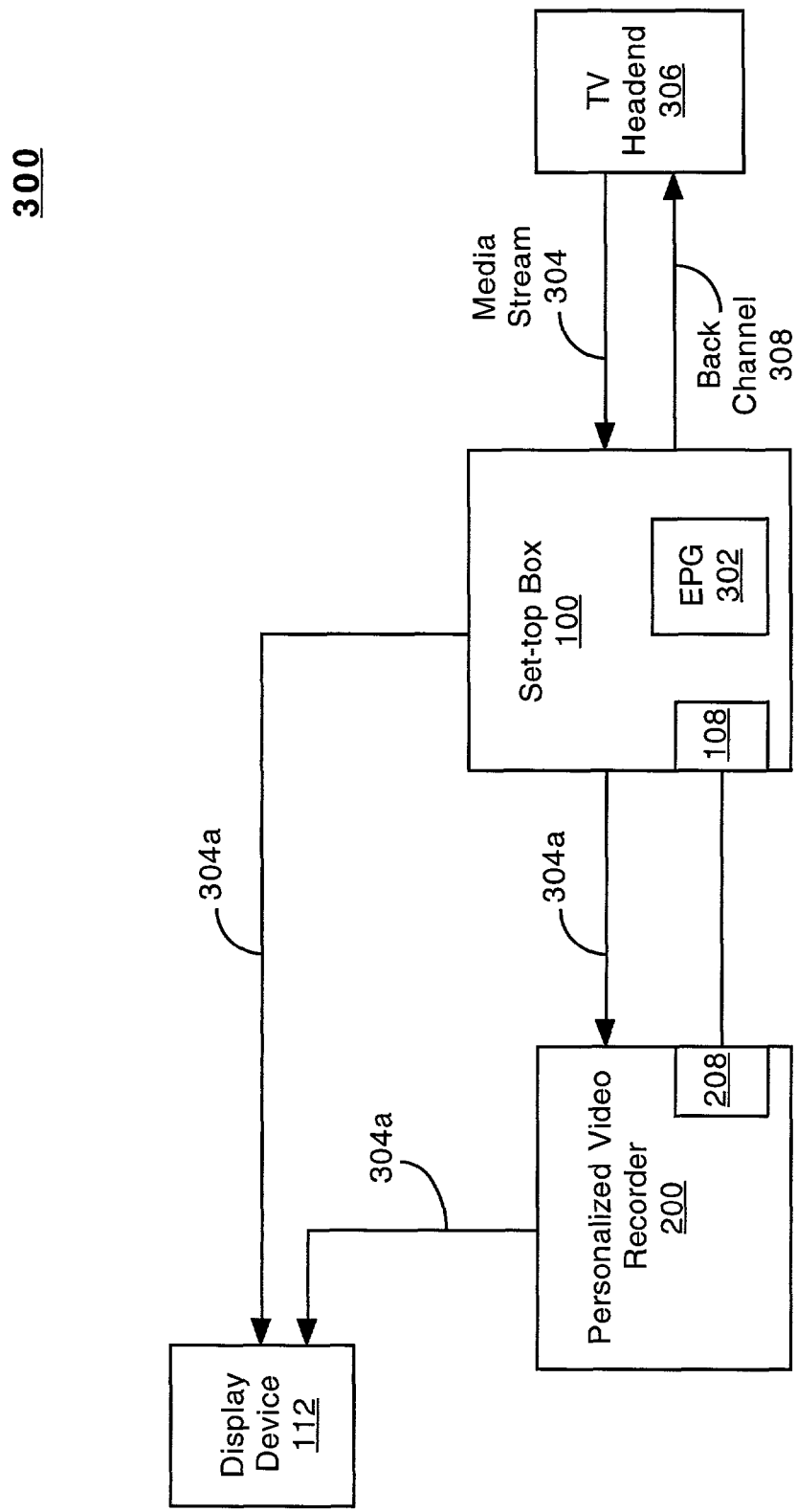
FIG. 3 is a block diagram of an exemplary network used in accordance with one embodiment of the present invention for enabling a personalized video recorder and a set-top box to function together.

FIG. 3 is a block diagram of an exemplary network 300 used in accordance with one embodiment of the present invention for enabling a personalized video recorder (e.g., 200) and a set-top box (e.g., 100) to function together. Specifically, network 300 includes personalized video recorder 200 that is communicatively coupled to set-top box 100 in accordance with one embodiment of the present invention. That is, the communication interface 108 of set-top box 100 is capable of interfacing with the communication interface 208 of personalized video recorder 200. Therefore, two way communication may occur between set-top box 100 and personalized video recorder 200 via communication interfaces 108 and 208. It should be appreciated that communication interfaces 108 and 208 may communicate utilizing wired and/or wireless technology. For example, communication interfaces 108 and 208 may utilize any of a number of well known communication standards and protocols, e.g., parallel, small computer system interface (SCSI), Ethernet, FireWire (IEEE 1394), Universal Serial Bus (USB), infrared (IR) communication, Bluetooth wireless communication, Home Phone Network (HPN), broadband, and the like.

Additionally, network 300 includes a television (TV) headend 306 which is communicatively coupled to set-top box 100. It is also understood that television headend 306 and set-top box 100 of the present embodiment are well suited to be coupled in a wide variety of implementations. For example, television headend 306 and set-top box 100 may be coupled via coaxial cable, copper wire, the Internet, fiber optics, wireless communication, and the like. Furthermore, display device 112 (e.g., television) is coupled to set-top box 100 and personalized video recorder 200. It is appreciated display device 112 of the present embodiment is well suited to be coupled to personalized video recorder 200 and not coupled to set-top box 100. Additionally, display device 112 is well suited to be coupled to set-top box 100 and personalized video recorder 200 utilizing wired and/or wireless communication technology.

Within the present embodiment, set-top box 100 of FIG. 3 is coupled to television headend 306 thereby enabling it to provide a media stream 304 to set-top box 100. Additionally, set-top box 100 is able to utilize a back-channel 308, e.g., telephone line or radio frequency (RF), to transmit information to television headend 306. Upon receiving media stream 304 from television headend 306, set-top box 100 converts it into an input signal 304a that it may output to display device 112 and/or personalized video recorder 200. It is appreciated that personalized video recorder 200 may subsequently transmit input signal 304a to display device 112. Furthermore, personalized video recorder 200 of the present embodiment does not include an internal electronic programming guide (EPG). However, the personalized video recorder 200 of the present embodiment is not restricted to this limitation and is well suited to include an internal EPG.

Exemplary Operations in Accordance with the Present Invention

Figure 4:
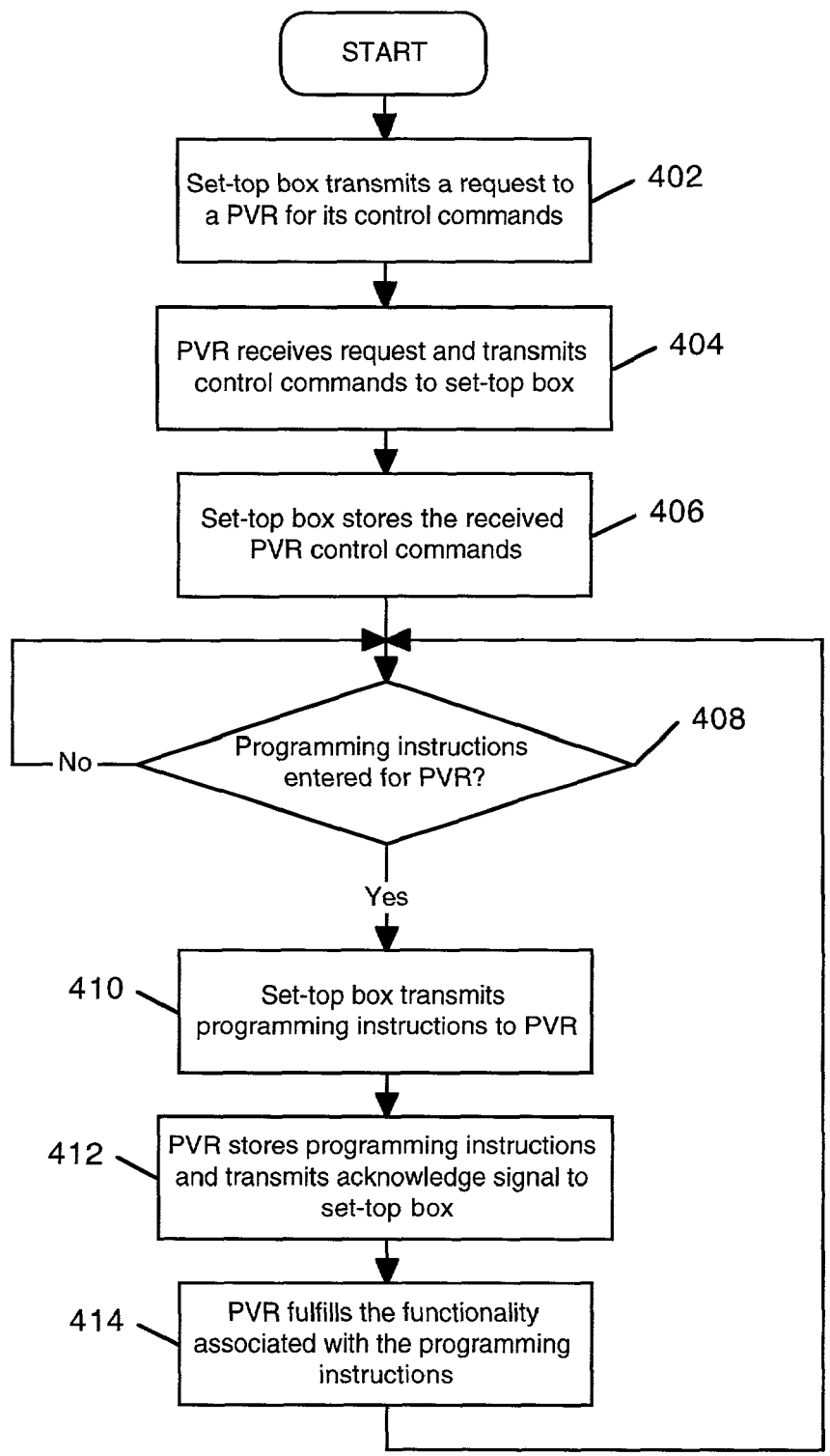
FIG. 4 is a flowchart of steps performed in accordance with one embodiment of the present invention for controlling a personalized video recorder via a set-top box.

FIG. 4 is a flowchart 400 of steps performed in accordance with one embodiment of the present invention for controlling a personalized video recorder (e.g., 200) via a set-top box (e.g., 100). Flowchart 400 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 400, such steps are exemplary. That is, the present invention is well suited to performing various other steps or variations of the steps recited in FIG. 4. Within the present embodiment, it should be appreciated that the steps of flowchart 400 may be performed by software or hardware or any combination of software and hardware.

The present embodiment causes a set-top box (e.g., 100) to request and receive from a personalized video recorder (e.g., 200) its control commands. The set-top box stores these control commands enabling it to display them to its users and also to control the functionality of the personalized video recorder. The present embodiment determines whether programming instructions have been entered into the set-top box that pertain to the control commands of the personalized video recorder. If programming instructions for the personalized video recorder have been entered into the set-top box, the present embodiment causes the set-top box to transmit the programming instructions to the personalized video recorder. After receiving the programming instructions, the present embodiment causes the personalized video recorder to add them to its programmable task list and to transmit an acknowledge signal to the set-top box. Subsequently, the personalized video recorder fulfills the functionality associated with the programming instructions that pertain to one or more of its control commands.

It should be appreciated that flowchart 400 is described in conjunction with FIG. 3 in order to more fully describe the operation of the present embodiment. At step 402, the present embodiment causes a set-top box (e.g., 100) to transmit a request signal to a personalized video recorder (e.g., 200) indicating a request for its control (or function) commands. It is understood that the present embodiment may perform step 402 anytime after the set-top box 100 is communicatively coupled to the personalized video recorder 200. In step 404, after personalized video recorder 200 receives the request signal, the present embodiment causes personalized video recorder 200 to transmit its control commands to set-top box 100. At step 406, after set-top box 100 receives the control commands of personalized video recorder 200, the present embodiment causes the set-top box 100 to store the received control commands. It is understood that by enabling set-top box 100 to have the control commands of personalized video recorder 200, the present embodiment is able to cause set-top box 100 to display them (via display device 112) to its users and also control the functionality of personalized video recorder 200.

In step 408 of FIG. 4, the present embodiment determines whether programming instructions have been entered into set-top box 100 that pertain to the control commands of personalized video recorder 200. Within the present embodiment, it should be appreciated that programming instructions for personalized video recorder 200 may be entered into set-top box 100 via an electronic programming guide (EPG) 302 operating on it. If the present embodiment determines that programming instructions have not been entered into set-top box 100 that pertain to the control commands of personalized video recorder 200, the present embodiment proceeds to the beginning of step 408. However, if the present embodiment determines that programming instructions have been entered into set-top box 100 that pertain to the control commands of personalized video recorder 200, the present embodiment proceeds to step 410.

At step 410, the present embodiment causes set-top box 100 to transmit to personalized video recorder 200 the programming instructions that pertain to one or more of its control commands. In step 412, the present embodiment causes personalized video recorder 200 to add the received programming instructions to its programmable task list and then transmit an acknowledge signal to set-top box 100 indicating it successfully received the programming instructions. At step 414, the present embodiment causes the personalized video recorder 200 to subsequently perform the functionality associated with the programming instructions that pertain to one or more of its control commands. Once step 414 is completed, the present embodiment proceeds to the beginning of step 408. It should be appreciated that the present embodiment may proceed to the beginning of step 408 after step 412 is completed.

Figure 5:
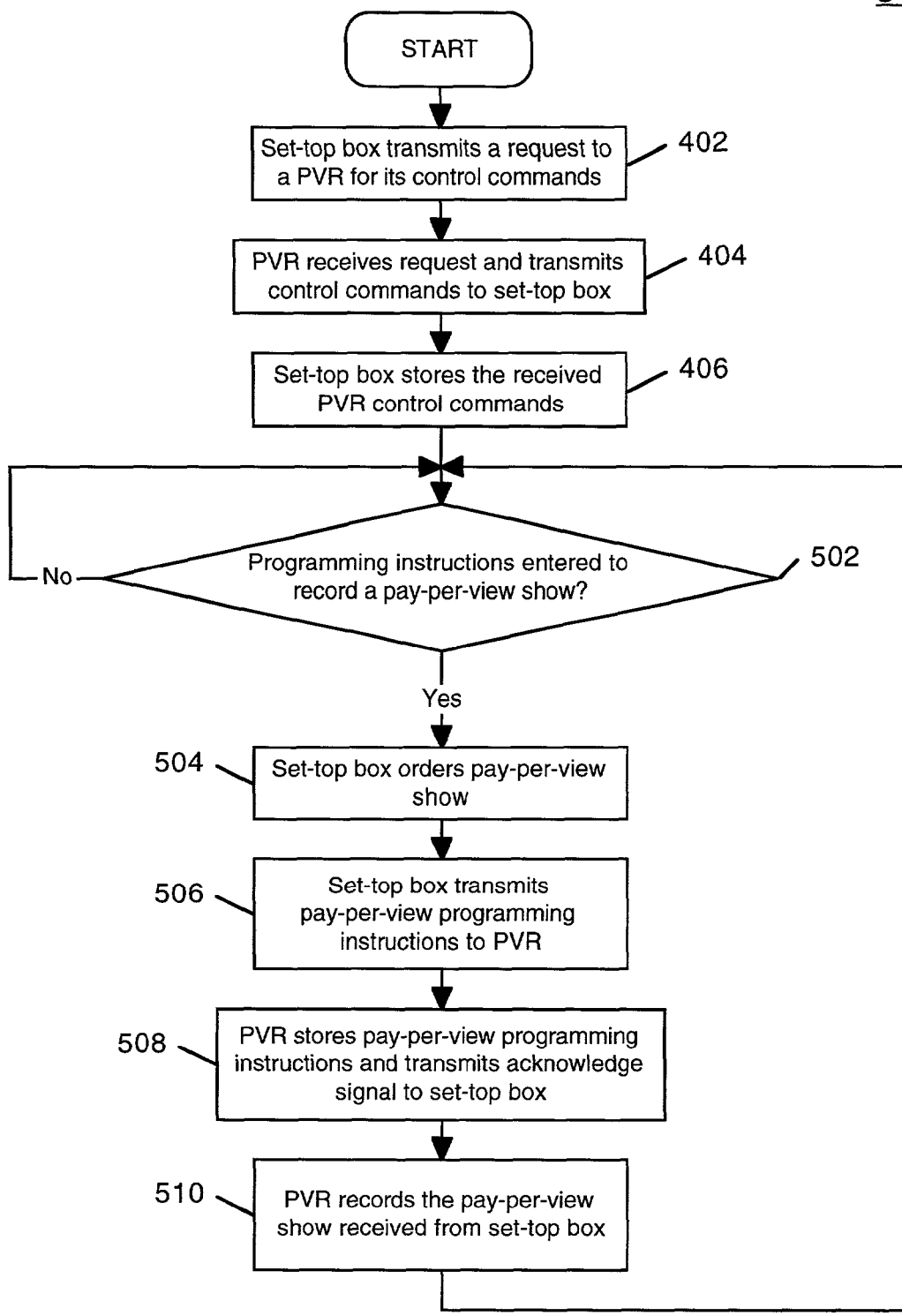
FIG. 5 is a flowchart of steps performed in accordance with one embodiment of the present invention for enabling a personalized video recorder and a set-top box to function together.

FIG. 5 is a flowchart 500 of steps performed in accordance with one embodiment of the present invention for enabling a personalized video recorder (e.g., 200) and a set-top box (e.g., 100) to function together. Flowchart 500 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 500, such steps are exemplary. That is, the present invention is well suited to performing various other steps or variations of the steps recited in FIG. 5. Within the present embodiment, it should be appreciated that the steps of flowchart 500 may be performed by software or hardware or any combination of software and hardware.

The present embodiment causes a set-top box (e.g., 100) to request and receive from a personalized video recorder (e.g., 200) its control (or function) commands. The set-top box stores these control commands enabling it to display them to its users and control the functionality of the personalized video recorder. The present embodiment determines whether programming instructions to record a pay-per-view show have been entered into the set-top box that pertain to the personalized video recorder. If pay-per-view programming instructions for the personalized video recorder have been entered into the set-top box, the present embodiment causes the set-top box to order the pay-per-view show from a television headend. Additionally, the present embodiment causes the set-top box to transmit the pay-per-view recording instructions to the personalized video recorder. After receiving the pay-per-view recording instructions, the present embodiment causes the personalized video recorder to add them to its programmable task list and to transmit an acknowledge signal to the set-top box. Subsequently, the personalized video recorder records the pay-per-view show received from the set-top box.

It should be appreciated that flowchart 500 is described in conjunction with FIG. 3 in order to more fully describe the operation of the present embodiment. Furthermore, it is understood that steps 402, 404, and 406 of FIG. 5 are similar to steps 402, 404, and 406 of FIG. 4 described above. At step 502, the present embodiment determines whether programming instructions to record a pay-per-view show have been entered into set-top box 100 that pertain to the personalized video recorder 200. Within the present embodiment, it should be appreciated that programming instructions to record a pay-per-view show for personalized video recorder 200 may be entered into set-top box 100 via the EPG 302 operating on it. If the present embodiment determines that pay-per-view programming instructions have not been entered into set-top box 100 that pertain to the personalized video recorder 200, the present embodiment proceeds to the beginning of step 502. However, if the present embodiment determines that pay-per-view programming instructions have been entered into set-top box 100 that pertain to the personalized video recorder 200, the present embodiment proceeds to step 504.

At step 504, the present embodiment causes the set-top box to order the pay-per-view show from a television headend (e.g., 306). It is appreciated that step 504 of the present embodiment may be implemented in a wide variety of ways. For example, at step 504, the present embodiment may utilize the EPG 302 operating on the set-top box 100 to order the pay-per-view show from the television headend 306 via backchannel 308. In step 506, the present embodiment causes set-top box 100 to transmit to personalized video recorder 200 the programming instructions to record the pay-per-view show.

In step 508 of FIG. 5, the present embodiment causes personalized video recorder 200 to add the received pay-per-view programming instructions to its programmable task list and then transmit an acknowledge signal to set-top box 100 indicating that it successfully received the pay-per-view programming instructions. At step 510, the present embodiment subsequently causes the personalized video recorder 200 to perform the pay-per-view programming instructions by recording the pay-per-view show (e.g., 304a) that it receives from the set-top box 100. Once step 510 is completed, the present embodiment proceeds to the beginning of step 502. It should be understood that the present embodiment may proceed to the beginning of step 502 after step 508 is completed.

Figure 6:
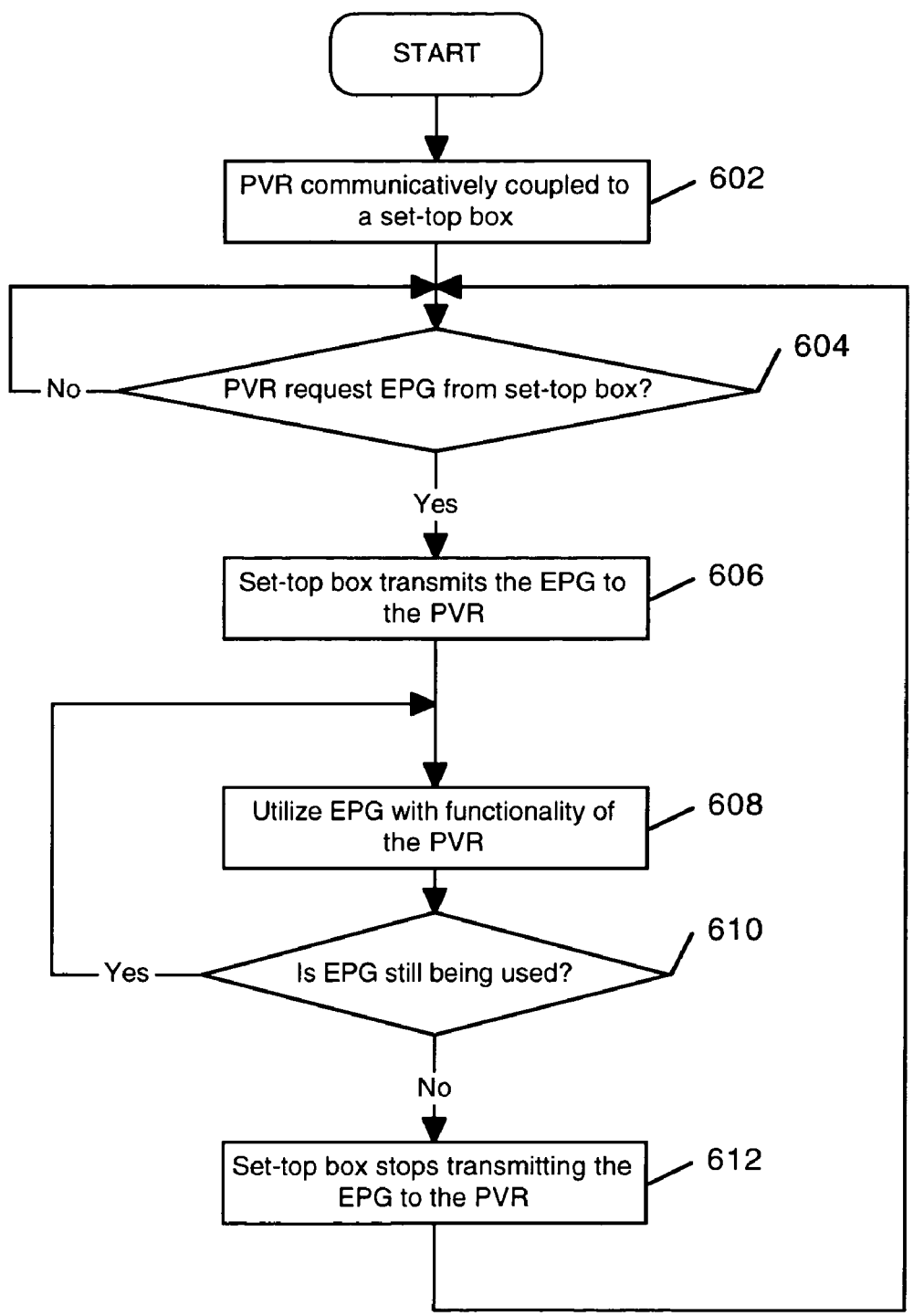
FIG. 6 is a flowchart of steps performed in accordance with one embodiment of the present invention for enabling a personalized video recorder to utilize an electronic programming guide (EPG) of a set-top box.

FIG. 6 is a flowchart 600 of steps performed in accordance with one embodiment of the present invention for enabling a personalized video recorder (e.g., 200) to utilize an electronic programming guide (e.g., EPG 302) of a set-top box (e.g., 100). Flowchart 600 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 600, such steps are exemplary. That is, the present invention is well suited to performing various other steps or variations of the steps recited in FIG. 6. Within the present embodiment, it should be appreciated that the steps of flowchart 600 may be performed by software or hardware or any combination of software and hardware.

Within the present embodiment, a personalized video recorder (e.g., 200) is communicatively coupled to a set-top box (e.g., 100). The present embodiment determines whether the personalized video recorder has requested an electronic programming guide (e.g., EPG 302) from the set-top box. If the personalized video recorder has requested the EPG from the set-top box, the present embodiment causes the set-top box to transmit the EPG to the personalized video recorder. As such, a user of the personalized video recorder is able to utilize the EPG along with functionality of the personalized video recorder. When the user is finished using the EPG with any functionality of the personalized video recorder, the present embodiment causes the set-top box to stop transmitting the EPG to the personalized video recorder.

It should be appreciated that flowchart 600 is described in conjunction with FIG. 3 in order to more fully describe the operation of the present embodiment. At step 602, within the present embodiment, a personalized video recorder (e.g., 200) is communicatively coupled to a set-top box (e.g., 100). It is appreciated that step 602 of the present embodiment is well suited to be implemented in a wide variety of ways. For example, the personalized video recorder (e.g., 200) and the set-top box (e.g., 100) may be communicatively coupled using wired and/or wireless communication technology. In step 604, the present embodiment determines whether the personalized video recorder 200 has requested an EPG (e.g., 302) from the set-top box 100. If the present embodiment determines that the personalized video recorder 200 has not requested EPG 302 from the set-top box 100 at step 604, the present embodiment proceeds to the beginning of step 604. However, if the present embodiment determines that the personalized video recorder 200 has requested EPG 302 from the set-top box 100 at step 604, the present embodiment proceeds to step 606.

In step 606 of FIG. 6, the present embodiment causes set-top box 100 to transmit EPG 302 to personalized video recorder 200. At step 608, the present embodiment enables the EPG 302 to be utilized along with functionality of the personalized video recorder 200. At step 610, the present embodiment determines whether the EPG 302 is still being utilized with functionality of the personalized video recorder 200. If the present embodiment determines that the EPG 302 is still being utilized with functionality of the personalized video recorder 200 at step 610, the present embodiment proceeds to the beginning of step 608. However, if the present embodiment determines that the EPG 302 is not being utilized with functionality of the personalized video recorder 200 at step 610, the present embodiment proceeds to step 612. In step 612, the present embodiment causes the set-top box 100 to cease transmitting the EPG 302 to personalized video recorder 200. Once step 612 is completed, the present embodiment proceeds to the beginning of step 604.

Accordingly, the present invention provides a method and system that enables a personalized video recorder to reliably record automatically a pay-per-view show (e.g., movie, event, etc.) that it receives from a set-top box.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A non-transitory system comprising:
    a set-top box device comprising:
        a communication interface having two way communication capability; and
        an electronic programming guide (EPG) operating on said set-top box device; and
    a digital video recorder device comprising:
        a communication interface having two way communication capability that is coupled to said communication interface of said set-top box device, wherein said digital video recorder device is configured to transmit a request for said EPG to said set-top box device via said communication interfaces, wherein said set-top box device is configured to transmit said EPG to said digital video recorder device via said communication interfaces, and wherein said set-top box device is configured to stop transmitting said EPG to said digital video recorder device when said EPG is not being utilized with said digital video recorder device; and
        a recording control command that causes said digital video recorder device to record,
    wherein said set-top box device is a first distinct device and said digital video recorder device is a second distinct device;
    wherein after said set-top box device is communicatively coupled to said digital video recorder device, said set-top box device is configured to transmit a request signal to said digital video recorder device for said recording control command of said digital video recorder device;
    wherein after receiving said request signal, said digital video recorder device is configured to transmit to said set-top box device said recording control command of said digital video recorder device;
    wherein said set-top box is configured to receive said recording control command from said digital video recorder device, wherein said recording control command equips said set-top box device with the ability to control the recording functionality of said digital video recorder device, wherein said set-top box device is configured to use said recording control command to determine if a recording programming instruction for said digital video recorder device has been entered into said set-top box device via said EPG;
    wherein after said recording programming instruction is entered, said set-top box is configured to transmit said recording programming instruction to said digital video recorder device to record, wherein said digital video recorder device is configured to transmit an acknowledge signal to said set-top box device after said recording programming instruction is added to a task list of said digital video recorder device.

2. The system of claim 1 wherein said recording programming instruction is for recording a pay-per-view show.

3. The system of claim 2 wherein said set-top box device is configured to order said pay-per-view show from a television headend, said set-top box device coupled to said television headend.

4. The system of claim 3 wherein said set-top box device is coupled to said television headend via the Internet.

5. The system of claim 2 wherein said electronic programming guide is configured to order said pay-per-view show.

6. The system of claim 2 wherein said electronic programming guide is configured to order said pay-per-view show while said set-top box transmits said recording programming instruction to said digital video recorder device.

7. The system of claim 6 wherein said set-top box device is configured to store said recording control command received from said digital video recorder device.

8. The system of claim 3 wherein said digital video recorder device is configured to perform said recording programming instruction by recording said pay-per-view show.

9. The system of claim 1 wherein said system further comprises a display device coupled to said digital video recorder device and not coupled to said set-top box device.

10. The system of claim 3 wherein said digital video recorder device does not include an internal electronic programming guide.

11. A method comprising:
- a set-top box device communicatively coupling to a digital video recorder device via two way communication, said set-top box device is a first distinct device and said digital video recorder device is a second distinct device;
- after said set-top box device communicatively coupling to said digital video recorder device, said set-top box device transmitting a request signal to said digital video recorder device for a recording control command that causes said digital video recorder device to record;
- after receiving said request signal, said digital video recorder device transmitting to said set-top box device said recording control command of said digital video recorder device;
- said set-top box device receiving said recording control command, wherein said recording control command equips said set-top box device with the ability to control the recording functionality of said digital video recorder device;
- an electronic programming guide (EPG) operating on said set-top box device;
- said digital video recorder device transmitting a request for said EPG to said set-top box device via said two way communication;
- said set-top box device transmitting said EPG to said digital video recorder device via said two way communication;
- said set-top box device ceasing transmitting of said EPG to said digital video recorder device when said EPG is not being utilized with said digital video recorder device;
- determining whether a recording programming instruction to record a pay-per-view show at a designated time in the future has been received by said set-top box device via said EPG operating on said set-top box device, said recording programming instruction pertains to said recording control command;
- after receiving said recording programming instruction, said electronic programming guide ordering said pay-per-view show associated with the programming instruction;
- after receiving said recording programming instruction, said set-top box device transmitting said recording programming instruction to said digital video recorder device; and
- said digital video recorder device transmitting an acknowledge signal to said set-top box device after said recording programming instruction is added to a task list of said digital video recorder device.

12. The method of claim 11 wherein said ordering occurs while said transmitting said recording programming instruction occurs.

13. The method of claim 12 wherein after said set-top box device receiving said recording control command of said digital video recorder device, said set-top box device storing said recording control command of said digital video recorder device.

14. A computer readable medium having computer readable code embodied therein for causing a system to perform a method comprising:
- a set-top box device communicatively coupling to a digital video recorder device via two way communication, said set-top box device is a first distinct device and said digital video recorder device is a second distinct device;
- after said set-top box device communicatively coupling to said digital video recorder device, said set-top box device transmitting a request signal to said digital video recorder device for a recording function command that causes said digital video recorder device to record;
- after receiving said request signal, said digital video recorder device transmitting to said set-top box device said recording function command of said digital video recorder device;
- said set-top box device receiving said recording function command, wherein said recording function command equips said set-top box device with the ability to control the recording functionality of said digital video recorder device;
- an electronic programming guide (EPG) operating on said set-top box device;
- said digital video recorder device transmitting a request for said EPG to said set-top box device via said two way communication;
- said set-top box device transmitting said EPG to said digital video recorder device via said two way communication;
- said set-top box device stopping transmitting of said EPG to said digital video recorder device when said EPG is not being utilized with said digital video recorder device;
- determining whether a recording programming instruction to record a pay-per-view show at a designated time in the future has been received by said set-top box device via said EPG operating on said set-top box device, said recording programming instruction pertains to said recording function command;
- after receiving said recording programming instruction, said set-top box device transmitting said recording programming instruction to said digital video recorder device; and
- said digital video recorder device transmitting an acknowledge signal to said set-top box device after said recording programming instruction is added to a task list of said digital video recorder device.

15. The non-transitory computer readable medium of claim 14 further comprising:
- after receiving said recording programming instruction, said electronic programming guide ordering said pay-per-view show associated with the programming instruction.

16. The non-transitory computer readable medium of claim 15 wherein said digital video recorder device does not include an internal electronic programming guide.

17. The non-transitory computer readable medium of claim 14 wherein said method further comprising:
- after said set-top box device receiving said recording function command, said set-top box device storing said recording function command of said digital video recorder device.

18. The non-transitory computer readable medium of claim 17 wherein said set-top box device and said digital video recorder device are coupled to a display device.

* * * * *